United States Patent [19]

Faulkner et al.

[11] Patent Number: 6,002,870

[45] Date of Patent: Dec. 14, 1999

[54] METHOD AND APPARATUS FOR NON-DAMAGING PROCESS DEBUGGING VIA AN AGENT THREAD

[75] Inventors: Roger A. Faulkner, Mountain View; Timothy P. Marsland, Half Moon Bay, both of Calif.

[73] Assignee: Sun Microsystems, Inc., Palo Alto, Calif.

[21] Appl. No.: 08/866,337

[22] Filed: May 30, 1997

[51] Int. Cl.[6] ................................................. G06F 9/44
[52] U.S. Cl. ................................... 395/704; 395/672
[58] Field of Search ..................... 395/704, 672, 395/676, 183.01, 183.14, 200.51

[56] References Cited

U.S. PATENT DOCUMENTS

| | | | |
|---|---|---|---|
| 5,179,702 | 1/1993 | Spix et al. ............................ | 395/672 |
| 5,301,198 | 4/1994 | Kawasaki ............................. | 395/183.01 |
| 5,485,579 | 1/1996 | Hitz et al. ............................ | 395/200.51 |
| 5,692,193 | 11/1997 | Jagannathan et al. .................. | 395/676 |
| 5,787,245 | 7/1998 | You et al. ............................ | 395/183.14 |

*Primary Examiner*—Tod R. Swann
*Assistant Examiner*—Matthew Smithers
*Attorney, Agent, or Firm*—Sabath & Truong

[57] ABSTRACT

Apparatus, methods and computer program products are disclosed that create an "agent LWP" in a target process. Creation of the agent LWP allows a controlling process to control execution of computer instructions within the target process without co-opting an existing LWP in the target process. The invention thus provides a mechanism that does not unintentionally change the state of the target process because existing partially-completed system calls do not need to be aborted and reissued.

22 Claims, 8 Drawing Sheets

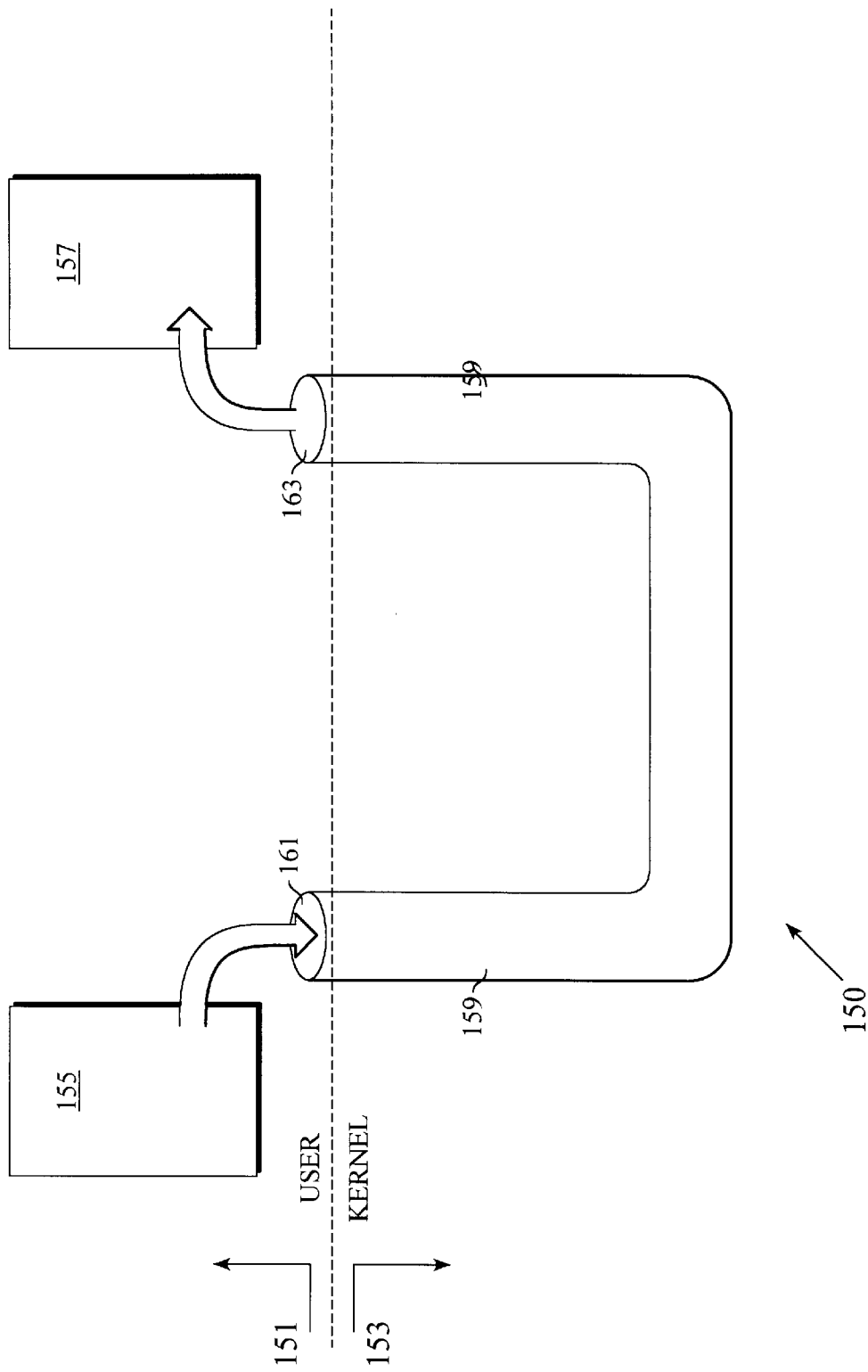

METHOD AND APPARATUS FOR NON-DAMAGING PROCESS DEBUGGING VIA AN AGENT THREAD

BACKGROUND OF THE INVENTION

1. Field of the Invention

This invention relates to the field of computer program control applications such as a debugging application. Specifically, this invention includes a method, apparatus, and computer program product for enabling a controlling programmed-process to control a target programmed-process executing in a computer having an operating system that provides programmed-processes with multiple, separately schedulable, threads of execution.

2. Background

Controlling programmed-processes are applications that directly control a target programmed-process without programmed cooperation by the target programmed-process. A controlling programmed-process is often used as a program debugging application. A debugging application provides a programmer with tools for examining, modifying, monitoring, and controlling the execution of the target programmed-process being debugged. The debugging application must not inadvertently change the state of the target programmed-process. The prior art controlling programmed-process controls the target programmed-process by co-opting a thread of execution in the target programmed-process. The prior art in multithreaded operation is discussed in *Multithreaded Implementations and Comparisons*, by Sun Microsystems, Inc., copyright 1996. A particular implementation of the prior art is discussed in *SunOS Multi-thread Architecture*, by Powell, Kleiman, Barton, Shah, Stein and Weeks, USENIX, Winter 1991, page 65.

A prior art controlling programmed-process first stops all lightweight programmed-processes (LWPs) owned by the target programmed-process. Once all the LWPs are stopped, the controlling programmed-process co-opts one of the target programmed-process's LWPs to perform debugging operations within the target programmed-process's address space. The controlling programmed-process co-opts the target programmed-process's LWP by specifying where in the target programmed-process the LWP is to execute once the LWP is resumed. Thus, the controlling programmed-process can insert computer instructions within the target programmed-process and cause these inserted computer instructions to be executed by the target programmed-process on behalf of the controlling programmed-process. This operation is subsequently described with respect to FIGS. 1a and 1b. Briefly, the LWP is co-opted by stopping the LWP either before, during, or after execution of an operating system service requested by the target programmed-process. The co-opted LWP is restarted from where it was stopped after the co-opted LWP is used by the controlling programmed-process. The LWP is restarted by adjusting the LWP to reissue the computer instruction that invoked the stopped operating system service (if the LWP was stopped prior to the system providing the requested service) or to execute the computer instruction after the instruction that invoked the stopped operating system service (if the LWP was stopped after the system provided the requested service).

A problem exists when the LWP is stopped during execution of the operating system service when only a portion of the operating system service has been completed (such as during a non-atomic system service). In this circumstance, if the instruction that invoked the operation is not reissued, the LWP will continue without the requested system service operation completing. On the other hand, if the instruction is reissued, portions of the requested system service operation will be duplicated. Both of these conditions cause unexpected side-effects in the target programmed-process and are a result of the operation of a controlling programmed-process operation on the target programmed-process. Thus the controlling programmed-process can cause incorrect operation of the co-opted LWP when the co-opted LWP is restarted.

SUMMARY OF THE INVENTION

The present invention provides an apparatus, method and computer program product for allowing a controlling program (such as a debugging program) to cause a target program to execute computer instructions without co-opting any of the target program's existing LWPs. The invention creates a special new "agent LWP" in the target programmed-process. Because the invention does not co-opt an existing LWP, but instead uses the agent LWP to execute computer code in the target programmed-process, partially completed operating system kernel (OSK) operations in the original LWPs are not disturbed. Thus, the original LWPs execute correctly when resumed.

One aspect of the invention includes a computer controlled method for controlling a target programmed-process from a controlling programmed-process. The target programmed-process has a first non-agent lightweight programmed-process (LWP) that is scheduled by an operating system. The operating system has the capability of scheduling a plurality of LWPs in the target programmed-process. The computer controlled method includes the step of stopping execution of the first non-agent LWP. The method also includes the step of the controlling programmed-process invoking a first agent LWP in the target programmed-process. This step causes the target programmed-process to execute code as specified by the controlling programmed-process.

Another aspect of the invention includes an apparatus for controlling a target programmed-process from a controlling programmed-process. The apparatus includes a central processing unit (CPU) and a memory coupled to the CPU. The target programmed-process has a first non-agent lightweight programmed-process (LWP) that is scheduled by an operating system capable of scheduling a plurality of LWPs in the target programmed-process. The apparatus includes a stop mechanism and an invocation mechanism. The stop mechanism stops execution of the first non-agent LWP. The invocation mechanism invokes, by the controlling programmed-process, a first agent LWP in the target programmed-process. The first agent LWP causes the target programmed-process to execute code specified by the controlling programmed-process. The invocation mechanism is dependent on the stop mechanism.

Yet a further aspect of the invention includes a computer program product embedded on a computer usable medium for causing a computer to control a target programmed-process from a controlling programmed-process. The target programmed-process has a first non-agent lightweight programmed-process (LWP) that is scheduled by an operating system capable of scheduling a plurality of LWPs in the target programmed-process. When executed on a computer, the computer readable code causes a computer to effect a stop mechanism and an invocation mechanism. Each of these mechanisms having the same functions as the corresponding mechanisms for the previously described apparatus.

These and other objects and features of the invention will become apparent when the following detailed description is read in combination with the accompanying figures.

DESCRIPTION OF THE DRAWINGS

FIGS. 1a & 1b illustrate a thread of execution in user- and kernel-access space (1a) and an example of prior art usage (1b) (1b);

DESCRIPTION OF THE PREFERRED EMBODIMENTS

Notations and Nomenclature

Figure 1A:
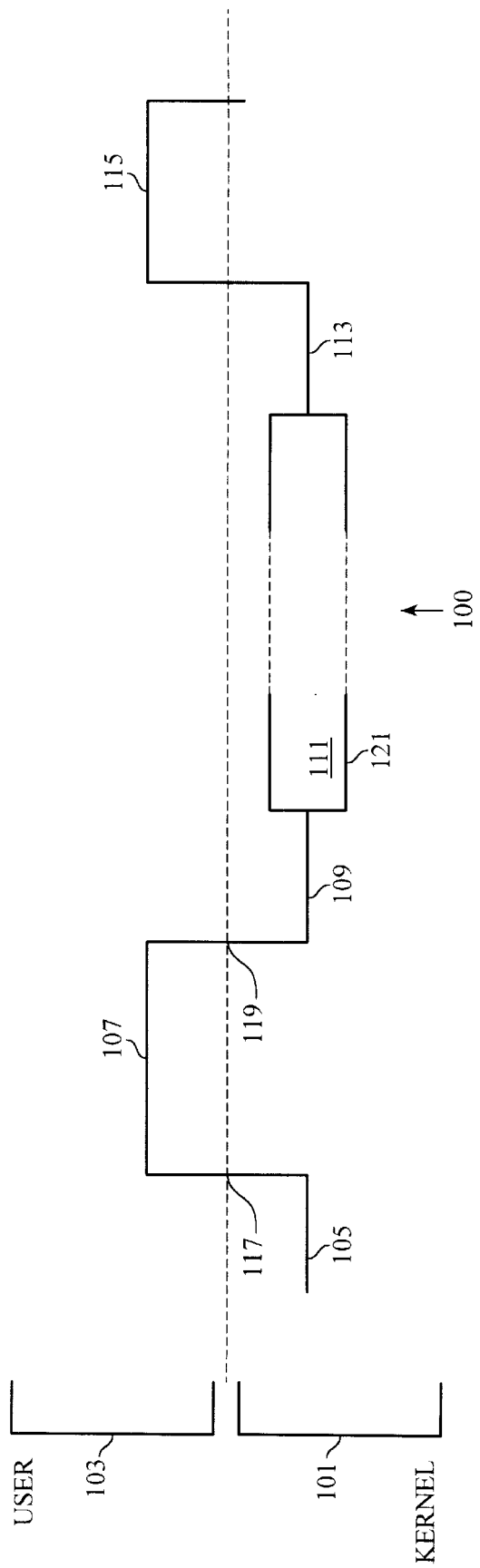

The following 'notations and nomenclature' are provided to assist in the understanding of the present invention and the preferred embodiments thereof.

Agent LWP—An agent LWP is a special LWP that can be created in a target programmed-process by a controlling programmed-process. Only one agent LWP can exist in a programmed-process at any given time. Non-agent LWPs in a programmed-process are stopped while an agent LWP exists in the programmed-process. Additional agent LWP characteristics are subsequently described.

LWP—Lightweight programmed-process. In many modern operating systems (such as the SunOS® and UNIX-WARE® operating systems) a programmed-process comprises an address space and a set of lightweight programmed-processes (LWPs). The terminology used in the art for LWP is "lightweight process". Each LWP can be considered as a virtual CPU available for executing code or system calls. Each LWP is a thread of execution that is separately scheduled by the OSK, may perform independent system calls and may run in parallel on a multiprocessor computer. These operating systems provide facilities that enable controlling programmed-processes. These facilities provide control points where a target programmed-process's LWP can be stopped, intercepted and resumed by the controlling programmed-process. Thus, the controlling programmed-process can stop and resume LWPs within the target programmed-process. Those skilled in the art will understand that some operating systems may use different terminology (such as "thread") to refer to operating system facilities that correspond to the LWP.

Non-Agent LWP—A LWP that is not an agent LWP.

Operating System—An operating system is a program that manages the resources required by programmed-processes. An operating system has many components that provide services to programmed-processes. One component of the operating system is the operating system kernel (OSK). The OSK provides fundamental operating system services. These fundamental services include those such as resource scheduling, memory management, input/output operations and system services. Computers that have access-mode capabilities provide layered protection for different classes of programs. In these systems, OSK procedures generally operate within the kernel-access mode. The kernel-access mode allows OSK procedures to have unrestricted access to all the computer's hardware capabilities. Application programmed-processes generally operate within a user-access mode. The user-access mode limits the programmed-process's access to the computer's hardware facilities. Thus, programmed-processes use "system calls" to request the OSK to perform operations that are prohibited in user-access mode. The system call triggers an exception in the kernel-access mode that is processed by the OSK to perform the service requested by the system call. Additionally, the OSK schedules programmed-processes by manipulating schedulable entities maintained by the OSK. These schedulable entities often represent threads-of-execution.

OSK—The operating system kernel is described above.

Process—A method-processes that is a plurality of steps for performing an operation. The term "programmed-process" corresponds to the term "process" as commonly used in the art. This description uses the term "process" to mean a method process as distinguished from a "programmed-process".

Programmed-Process—A programmed-process is a computer program that is controlled and managed by an operating system. The operating system provides resources to the programmed-process. Among others, these resources include memory and central processor unit (CPU) execution resources. In computer systems that provide memory protection, a programmed-process has its own protected address-area in memory that is not directly accessible by another programmed-process. Further, a programmed-process has at least one thread of execution.

Thread—A thread-of-execution is a sequence of control within a programmed-process. A traditional single-threaded programmed-process follows a single sequence of control while executing. A multithreaded programmed-process has several sequences of control, and is capable of several independent actions. There are multiple approaches used to implement threads. One approach is a many-to-one model that supports multiple threads in the user-access space all executing dependent on a single OSK schedulable entity. This approach limits the independent actions of multiple threads to that of the programmed-process's user space. Thus, this approach multiplexes the threads within the programmed-process when the programmed-process is executing as a result of the OSK scheduling a single schedulable entity belonging to the programmed-process (such as a light weight programmed-process (LWP)). This approach only allows one thread to invoke a system call at any given time.

Another approach is a many-to-many model. In this model, a programmed-process may have both multiple kernel schedulable entities and multiple programmed-process scheduled threads. The OSK supports multiple schedulable entities for each programmed-process. Each OSK schedulable entity belonging to the programmed-process can invoke system services. Thus, multiple threads in the programmed-process can concurrently access system services.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing programmed instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

FIGS. 1a and 1b are used to illustrate the prior art approach, previously mentioned, that uses a controlling programmed-process to co-opt an existing LWP in a target programmed-process so that the target programmed-process executes computer instructions on behalf of the controlling programmed-process. FIG. 1a illustrates an execution path of a LWP between the kernel- and user-access modes as indicated by general reference character 100. The execution path 100 moves between a kernel-access mode 101 and a user-access mode 103 corresponding to the respective computer access mode within which the LWP executes. Execution of the LWP starts at a first OSK procedure 105 that is generally a result of a LWP initiation. Eventually the first OSK procedure 105 completes and the execution path 100 moves into the user-access mode 103 and executes a first user procedure 107. At some point the first user procedure 107 executes a system call and the execution path 100 again enters the kernel-access mode 101. Now a second OSK procedure 109 processes the system call. In this particular example, the second OSK procedure 109 continues to a non-atomic OSK service 111. The non-atomic OSK service 111 is an OSK procedure that cannot always be completed without the LWP being rescheduled by the OSK. A third OSK procedure 113, after the non-atomic OSK service 111, completes the operation requested by the system call and the execution path 100 again moves to the user-access mode 103 to execute a second user procedure 115.

The OSK can stop a LWP at an 'exit kernel' point 117, an 'enter kernel' point 119, and an 'OSK LWP sleep' point 121.

Thus the LWP can be stopped just before the LWP leaves the kernel-access mode 101 (such as at the 'exit kernel' point 117), just after the LWP enters the kernel-access mode 101 (such as at the 'enter kernel' point 119), and when a nonatomic OSK service is blocked (such as at the 'OSK LWP sleep' point 121). Those skilled in the art will understand that other OSK operations may also serve as points to stop the LWP. The OSK can be conditioned to stop the LWP at these points 117, 119, 121 if the LWP is active and a privileged instruction trap, breakpoint trap, trace trap, watch-point trap or other suitable trap occurs.

A prior art controlling programmed-process first stops all LWPs owned by the target programmed-process. Once all the LWPs are stopped, the controlling programmed-process co-opts one of the target programmed-process's LWPs to perform debugging operations within the target programmed-process's address space. That is, once the LWP is co-opted, the controlling programmed-process can use the co-opted LWP to perform services for the controlling programmed-process. This is accomplished by inserting executable code into the address space of the target programmed-process and then causing the co-opted LWP to execute that code. The prior art approach used to co-opt the LWP is to place an activation record on the LWP's stack and point the LWP's program counter to the executable code that the controlling programmed-process desires the target programmed-process to execute. Once the co-opted LWP completes the operation for the controlling programmed-process, the co-opted LWP is returned to normal operation. This is accomplished by inserting executable code into the address space of the target programmed-process and then causing the co-opted LWP to execute that code. The prior art approach used to co-opt the LWP is to place an activation record on the LWP's stack and point the LWP's program counter to the executable code that the controlling programmed-process desires the target programmed-process to execute. Once the co-opted LWP completes the operation for the controlling programmed-process, the co-opted LWP is returned to normal operation. This is accomplished by restoring the target programmed-process's stack and, dependent on where the LWP was stopped (117, 119, 121), either re-executing the system call that was stopped or continuing from the instruction after the system call. Clearly, if the LWP is stopped at the 'exit kernel' point 117, the instruction that invoked the kernel operation should not be reissued. Conversely, if the LWP is stopped at the 'enter kernel' point 119, the instruction that invoked the kernel operation must be reissued. One difficulty with this approach occurs when the LWP is stopped during the 'OSK LWP sleep' point 121. In this circumstance it is unclear whether or not the instruction that invoked the kernel service, that caused the 'OSK LWP sleep' point 121, should be reissued.

The 'OSK LWP sleep' point 121 is used when the requested OSK service is not an atomic operation. One example of this type of service is that of writing to a UNIX pipe. FIG. 1b illustrates a pipe operation indicated by general reference character 150. The computer provides a user-access mode 151 and a kernel-access mode 153. A first programmed-process 155 and a second programmed-process 157 execute within the user-access mode 151. The first programmed-process 155 has established a pipe 159 between the first programmed-process 155 and the second programmed-process 157. The first programmed-process 155 then executes a system call that writes data to a pipe source 161. The OSK then stores the data in the pipe 159 until it can be read by the second programmed-process 157 from a pipe destination 163. Thus, the pipe 159 transfers data from the first programmed-process 155 to the second programmed-process 157 through the OSK. The pipe-write operation often fills the pipe without having transferred all the data requested by the pipe-write operation. At that point, the OSK places the LWP in a sleep state until the pipe is no longer full. This allows the OSK to schedule other LWPs to execute (including the LWP that consumes data from the pipe). Eventually, the sleeping LWP is continued by the OSK and additional data is placed in the pipe. This process possibly repeats until the pipe-write operation completes.

The invention addresses a problem that occurs when the LWP is stopped during execution of the operating system service and a portion of the operating system service has been completed. In this circumstance, if the instruction that invoked the operation is not reissued the LWP will continue without the requested system service operation completing. On the other hand, if the instruction is reissued, portions of the requested system service operation will be duplicated. Both of these conditions cause unexpected side-effects in the target programmed-process and are a result of the operation of a controlling programmed-process operation on the target programmed-process.

Operating Environment

Figure 2:
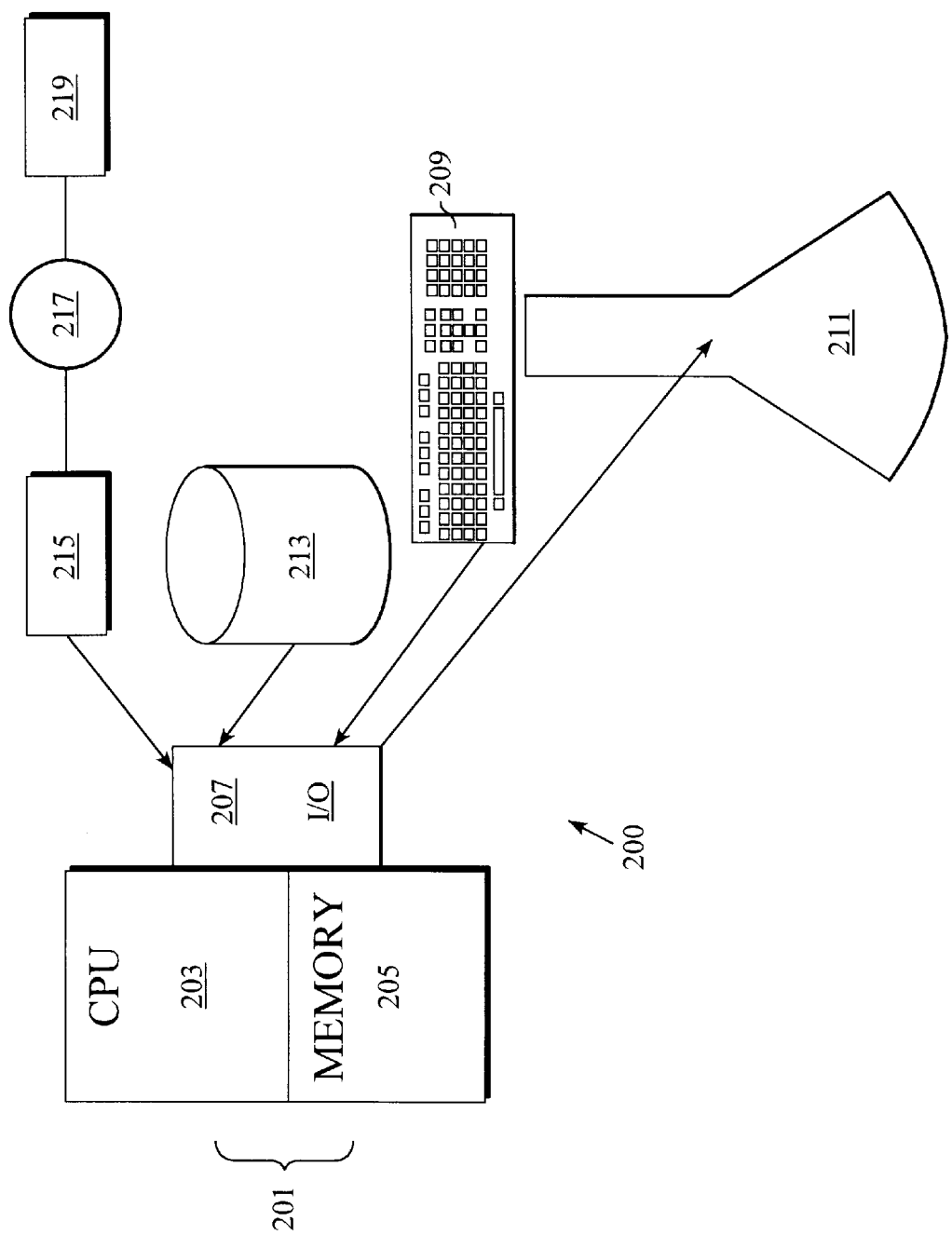
FIG. 2 illustrates a computer system capable of using the invention in accordance with a preferred embodiment.

Some of the elements of a computer, as indicated by general reference character 200, configured to support the invention are shown in FIG. 2 wherein a processor 201 is shown, having a central processor unit (CPU) 203, a memory section 205 and an input/output (I/O) section 207. The I/O section 207 is connected to a keyboard 209, a display unit 211, a disk storage unit 213 and a CD-ROM drive unit 215. The CD-ROM drive unit 215 can read a CD-ROM medium 217 that typically contains a program and data 219. The CD-ROM drive unit 215, along with the CD-ROM medium 217, and the disk storage unit 213 comprise a filestorage mechanism. One skilled in the art will understand that the CD-ROM drive unit 215 can be replace by a floppy disk, magnetic tape unit or similar device that accepts a removable media that can contain the program and data 219. Such a computer system is capable of executing programmed-processes that embody the invention.

The invention solves the previously described problem by using an agent LWP. The agent LWP is created by the controlling programmed-process and is attached to the target programmed-process. The controlling programmed-process then uses the agent LWP to perform the controlling programmed-process's desired operations within the target programmed-process instead of co-opting an existing LWP within the target programmed-process. Thus, an LWP that is in the midst of the 'OSK LWP sleep' point 121 is not co-opted. Because incomplete OSK operations are not co-opted the completed portion of the operation is not repeated nor is an incomplete portion ignored.

In a preferred embodiment, an agent LWP does not unintentionally change the state of the target programmed-process. Thus, the agent LWP is not detectable by the target programmed-process. Further, the agent LWP exists only when all the other LWPs in the programmed-process are fully stopped. In addition, the agent LWP is terminated before resuming a programmed-process's LWP. Also, the agent LWP is prohibited from creating other LWPs. Finally, only one agent LWP can be active in the target programmed-process at any given time and that agent LWP must be capable of performing calls as specified by the controlling programmed-process. In particular, the agent LWP must be capable of performing the system call that causes the agent LWP to terminate.

Figure 3:
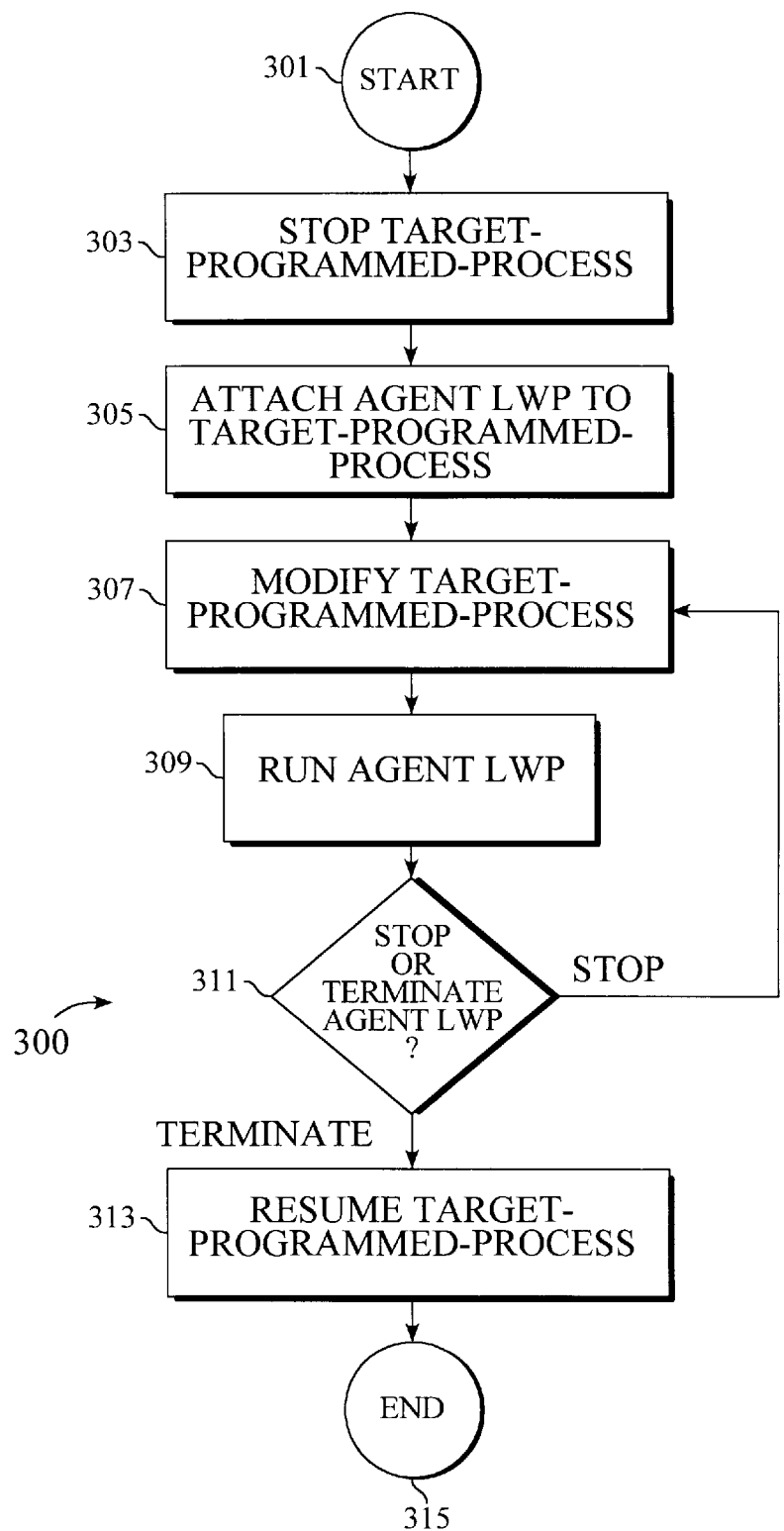
FIG. 3 illustrates a process using an agent LWP in a target-programmed-process in accordance with a preferred embodiment.

FIG. 3 illustrates a programmed-process control process, indicated by general reference character 300, executing in a controlling programmed-process, that stops a target programmed-process, causes the target programmed-process to execute inserted code, and resumes the target programmed-process. The programmed-process control process 300 initiates at a 'start' terminal 301 and continues to a 'stop target programmed-process' procedure 303. The 'stop target programmed-process' procedure 303 stops all the LWPs in the target programmed-process. Those skilled in the art will understand that, although these LWPs are stopped, they are still in existence and can be resumed. After stopping the target programmed-process, the programmed-process control process 300 continues to an 'attach agent LWP to target programmed-process' procedure 305 that creates an agent LWP in the target programmed-process. Then, a 'modify target programmed-process' procedure 307 modifies the target programmed-process by inserting executable computer instructions into the target programmed-process's address space. Next, a 'run agent LWP' procedure 309 starts the agent LWP in the target programmed-process at a specified executable computer instruction. This instruction is generally one that was inserted in the target programmed-process during the 'attach agent LWP to target programmed-process' procedure 305. However, those skilled in the art will understand that the controlling programmed-process can also specify an executable instruction that already existed in the target programmed-process instead of one inserted during the 'modify target programmed-process' procedure 307. The last instruction inserted by the 'modify target programmed-process' procedure 307 is an instruction that causes the agent LWP to stop or terminate. A 'stop or terminate agent LWP' decision procedure 311 determines whether the agent LWP was stopped or terminated. If the agent thread was stopped, the 'stop or terminate agent LWP' decision procedure 311 causes the programmed-process control process 300 to repeat back to the 'modify target programmed-process' procedure 307 so that the controlling programmed-process can cause the target programmed-process to perform additional operations for the controlling programmed-process. However, if the agent LWP was terminated instead of stopped the programmed-process control process 300 continues to a 'resume target programmed-process' procedure 313 that causes the target programmed-process to resume normal operation by resuming the LWPs that were stopped by the 'stop target programmed-process' procedure 303. Finally the programmed-process control process 300 completes through an 'end' terminal 315. Those skilled in the art will understand that, in SunOS, the LWP is terminated by a __lwp__exit (2) system call.

Figure 4A:
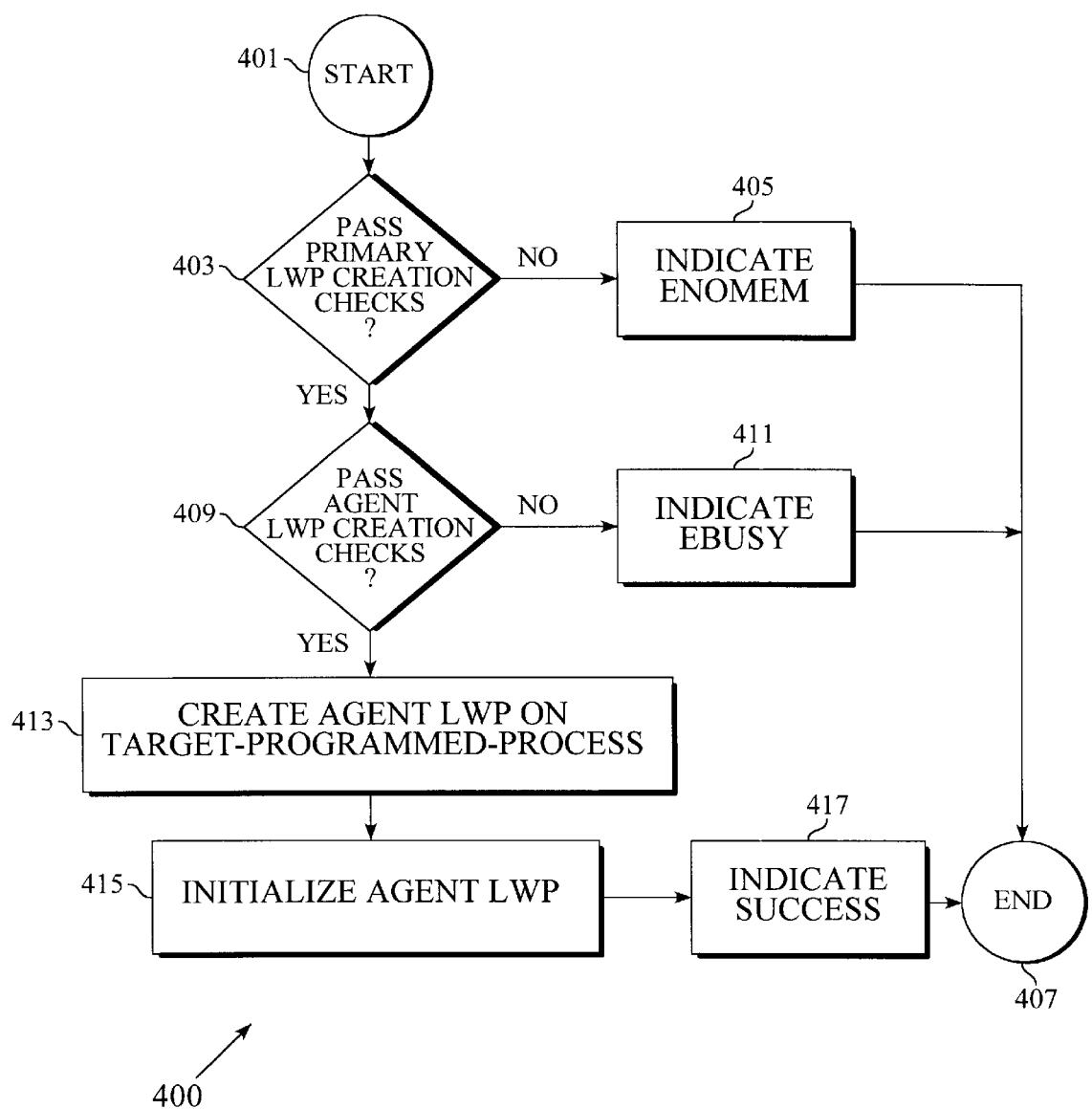
FIGS. 4a & 4b illustrate an agent LWP creation process (4a) and an agent LWP creation check process (4b) in accordance with a preferred embodiment.

FIG. 4a illustrates an 'agent LWP creation' process, indicated by general reference character 400, that creates an agent LWP in response to a system call. The 'agent LWP creation' process 400 is initiated when the 'modify target programmed-process' procedure 307 executes the system call to attach an agent LWP to the target programmed-process. The OSK dispatches the system call to the 'agent LWP creation' process 400 that initiates at a 'start' terminal 401 and continues to a 'pass primary LWP creation checks' decision procedure 403. The 'pass primary LWP creation checks' decision procedure 403 validates that the resources required by the parameters specified by the system call exist (such as enough system memory to create the LWP). If the required resources do not exist, the 'pass primary LWP creation checks' decision procedure 403 continues to an 'indicate ENOMEM fail' procedure 405 that conditions the 'agent LWP creation' process 400 to indicate an ENOMEM error condition when the 'agent LWP creation' process 400 completes. Then the 'agent LWP creation' process 400 completes through an 'end' terminal 407 indicating the ENOMEM error.

However, if the 'pass primary LWP creation checks' decision procedure 403 determines that sufficient resources exist, the 'agent LWP creation' process 400 continues to a 'pass agent LWP creation checks' decision procedure 409 that performs agent LWP specific validations as is subsequently described. In particular, if the target programmed-process already has an agent LWP, or one of the programmed-process's LWPs is in a state other than "stopped on an event of interest" or "suspended" the 'agent LWP creation' process 400 continues to an 'indicate EBUSY fail' procedure 411. The 'indicate EBUSY fail' procedure 411 conditions the 'agent LWP creation' process 400 to indicate an EBUSY error condition when the 'agent LWP creation' process 400 terminates. Next, the 'agent LWP creation' process 400 completes through the 'end' terminal 407 indicating the EBUSY error.

However, if the 'pass agent LWP creation checks' decision procedure 409 determines that the agent LWP can be attached to the target programmed-process, the 'agent LWP creation' process 400 continues to a 'create agent LWP in target programmed-process' procedure 413. The 'create agent LWP in target programmed-process' procedure 413 creates an agent LWP in the target programmed-process. Next, an 'initialize agent LWP' procedure 415 initializes the agent LWP using parameters communicated to the OSK by the system call and information maintained by the OSK. The agent LWP is initialized to be in the "stopped" state and is ready to be set running by the controlling programmed-process. Then, an 'indicate success' procedure 417 conditions the 'agent LWP creation' process 400 to indicate a success condition when the 'agent LWP creation' process 400 completes. The 'agent LWP creation' process 400 completes through the 'end' terminal 407 indicating success.

Figure 4B:
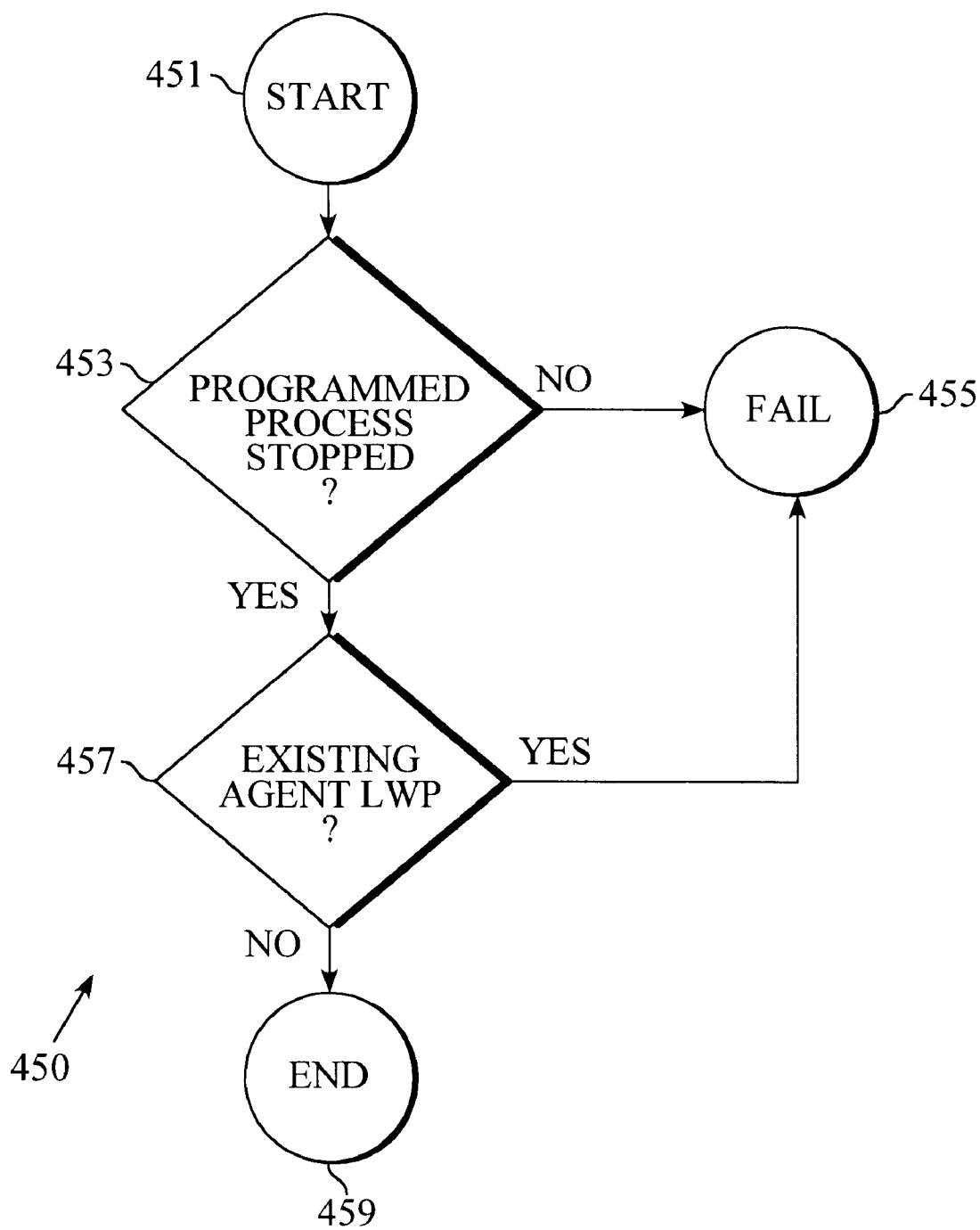

FIG. 4b illustrates an 'agent creation check' process, indicated by general reference character 450, that is invoked from the 'pass agent LWP creation checks' decision procedure 409. The 'agent creation check' process 450 initiates at a 'start' terminal 451 and continues to a 'program process stopped' decision procedure 453 that determines whether the target programmed-process is fully stopped—that is whether each LWP belonging to the target programmed-process is "stopped on an event of interest" or "suspended". If the target programmed-process is not fully stopped, the 'agent creation check' process 450 completes through a 'failure exit' terminal 455. However, if the 'program process stopped' decision procedure 453 determines that the target programmed-process is fully stopped, the 'agent creation check' process 450 continues to an 'existing agent LWP' decision procedure 457. The 'existing agent LWP' decision procedure 457 detects whether the target programmed-process already has an agent LWP. If the target programmed-process has an agent LWP, the 'existing agent LWP' decision procedure 457 continues to the 'failure exit' terminal 455. However, if the target programmed-process does not have an agent LWP, the 'agent creation check' process 450 completes through a 'success exit' terminal 459. Thus invoking the 'create agent LWP in target programmed-process' procedure 413 of FIG. 4a.

Figure 5:
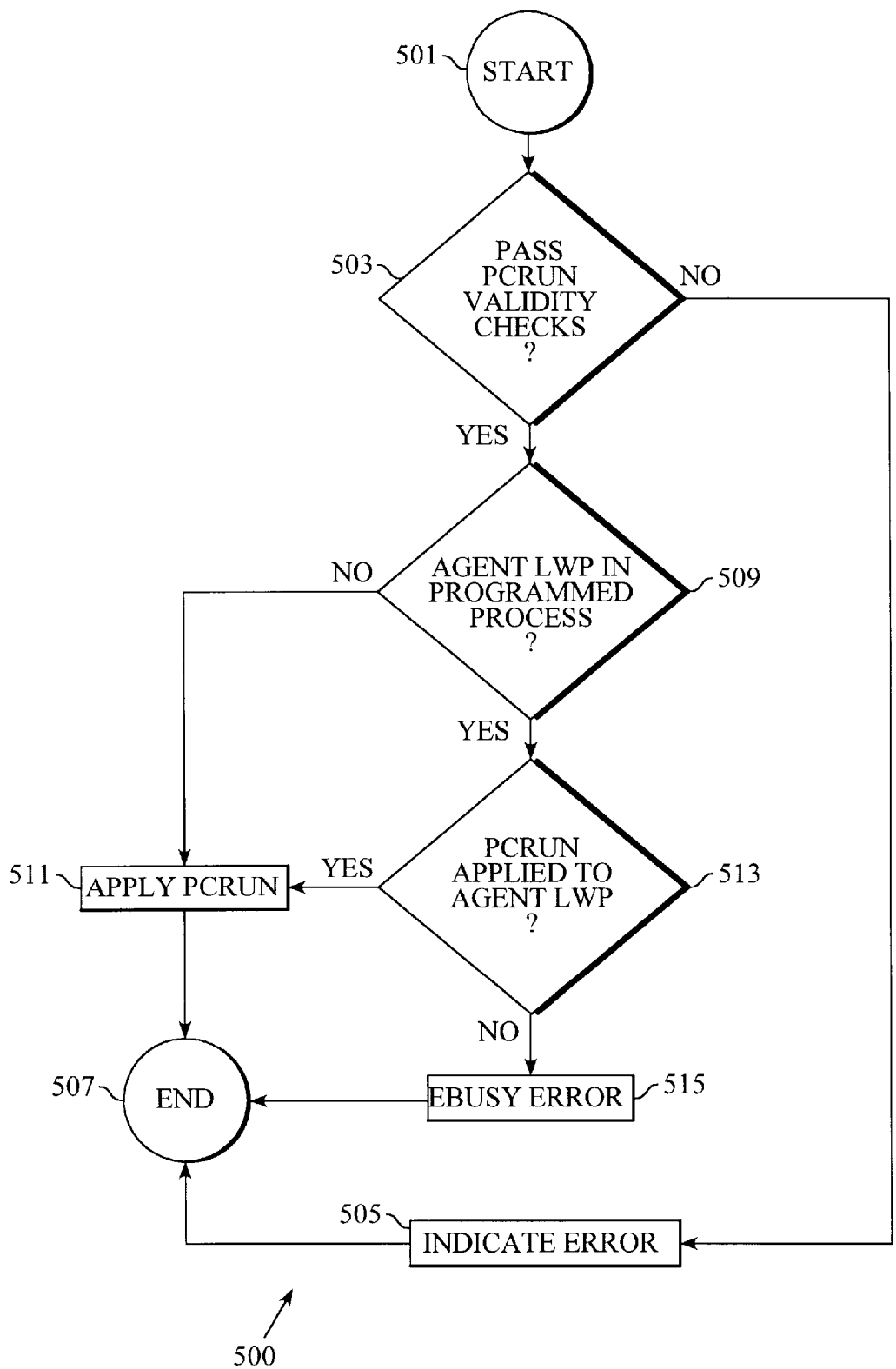
FIG. 5 illustrates the process used in the OSK to run an agent LWP in accordance with a preferred embodiment.

FIG. 5 illustrates a 'run LWP' process, indicated by general reference character 500, that is invoked by any 'run LWP' procedure including the 'run agent LWP' procedure 309. The 'run LWP' process 500 initiates at a 'start' terminal 501 and continues to a 'pass PCRun validity check' decision procedure 503. The 'pass PCRun validity check' decision procedure 503 checks the arguments provided by the PCRun system call and the characteristics of the target programmed-process specified by the PCRun system call. If these checks fail, the 'run LWP' process 500 continues to an 'indicate error' procedure 505 that conditions the 'run LWP' process 500 to indicate that the PCRun system call was unsuccessful. Next, the 'run LWP' process 500 completes through an 'end' terminal 507 indicating the error specified by the 'indicate error' procedure 505.

However, if the 'pass PCRun validity check' decision procedure 503 determines that the parameters provided by the PCRun system call and the state of the target programmed-process are valid, the 'run LWP' process 500 continues to an 'agent LWP in programmed-process' decision procedure 509. The 'agent LWP in programmed-process' decision procedure 509 detects whether the target programmed-process currently contains an existing agent LWP. If the target programmed-process does not contain an existing agent LWP, the 'run LWP' process 500 continues to an 'apply PCRun' procedure 511. The 'apply PCRun' procedure 511 schedules the specified non-agent LWP to start or resume. Next, the 'run LWP' process 500 completes through the 'end' terminal 507 indicating success.

If an agent LWP is attached to the target programmed-process at the 'agent LWP in programmed-process' decision procedure 509, the 'run LWP' process 500 continues to a 'PCRun directed to agent LWP' decision procedure 513. The 'PCRun directed to agent LWP' decision procedure 513 determines whether the PCRun system call was to be applied to the agent LWP in the target programmed-process or to a non-agent LWP. If the PCRun system call was directed to a non-agent LWP, the 'run LWP' process 500 continues to an 'indicate EBUSY error' procedure 515. The 'indicate EBUSY error' procedure 515 conditions the 'run LWP' process 500 to complete with an EBUSY error. Next, the 'run LWP' process 500 completes through the 'end' terminal 507 indicating an EBUSY error.

However, if the PCRun system call specified a PCRun operation on the process's only agent LWP, the 'PCRun directed to agent LWP' decision procedure 513 causes the 'run LWP' process 500 to continue to the 'apply PCRun' procedure 511. The 'apply PCRun' procedure 511 schedules the agent LWP to start or resume. Next, the 'run LWP' process 500 completes through the 'end' terminal 507 indicating success.

Figure 6:
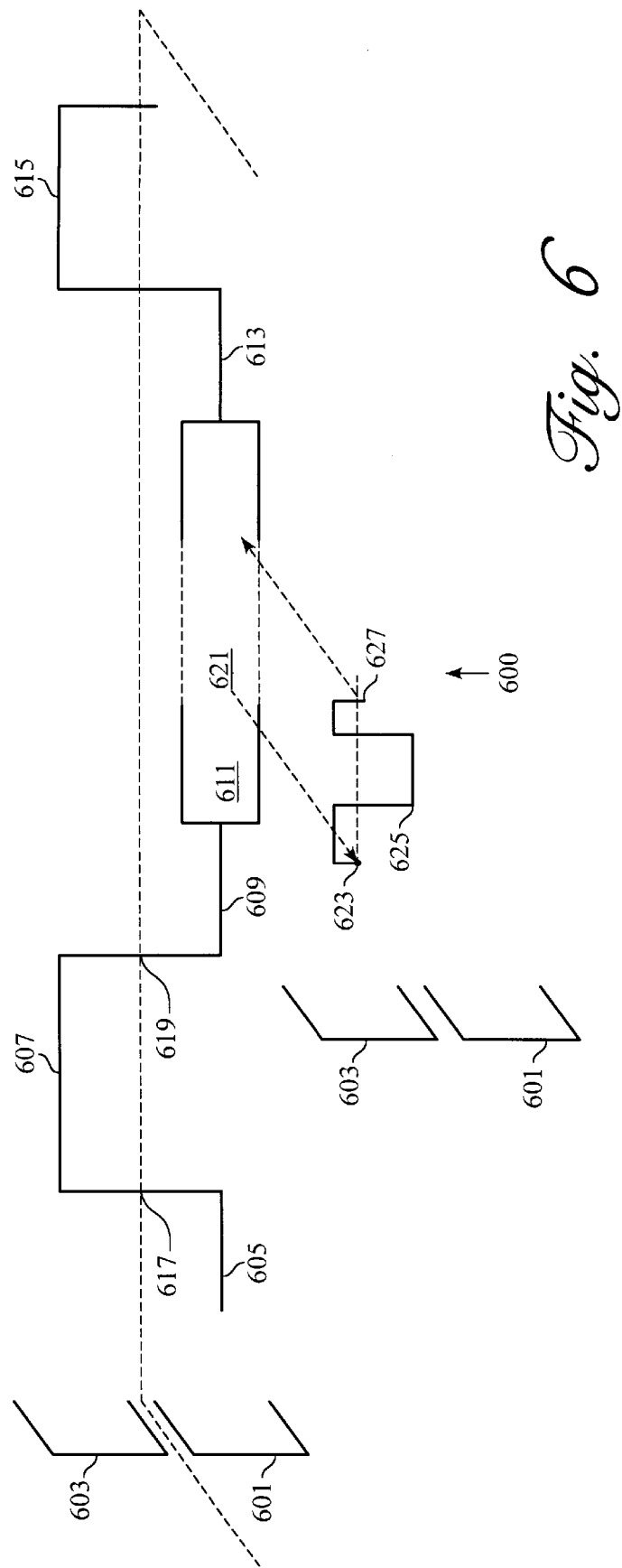
FIG. 6 illustrates the operation of the agent LWP in a target-programmed-process in accordance with a preferred embodiment.

FIG. 6 illustrates a LWP operation, indicated by general reference character 600, that indicates the interaction between an agent LWP and the non-agent LWPs of the target programmed-process. The LWP operation 600 is separated into a kernel-access mode 601 and a user-access mode 603. Execution of the LWP starts at a first kernel procedure 605 that is generally a result of a LWP initiation. After the first kernel procedure 605 the LWP operation 600 moves into the user-access mode 603 and follows a first user procedure 607. Eventually the application code executes a system call and the LWP operation 600 again enters the kernel-access mode 601. Now a second OSK procedure 609 processes the system call. In this particular example, the second OSK procedure 609 continues to a non-atomic OSK procedure 611. The non-atomic OSK procedure 611 is an OSK operation that cannot always be completed without the LWP being rescheduled. A third OSK procedure 613, after the non-atomic OSK procedure 611, completes the kernel call and the LWP operation 600 again moves to the user-access mode 603 for a second user procedure 615. As was illustrated in FIG. 1a the operating system can stop a LWP at an 'exit kernel' point 617, an 'enter kernel' point 619, and a 'sleep kernel' point 621. The invention does not co-opt the LWP operation 600 as does the prior art. Instead, when the LWP operation 600 is stopped at one of these points 617, 619, 621 the controlling programmed-process creates an agent LWP in the target programmed-process. In FIG. 6, for example, the controlling programmed-process creates an 'agent LWP creation' point 623 at the 'sleep kernel' point 621, in the target programmed-process. The agent LWP 625 executes in both the kernel-access mode 601 and the user-access mode 603 until the agent LWP 625 terminates itself at a 'LWP termination' point 627 by executing the _lwp_exit (2) system call (if the operating system is SunOS). Once the agent LWP 625 terminates and the controlling programmed-process resumes the target programmed-process, the non-atomic OSK procedure 611 can continue from where it left off once its LWP is scheduled. Because the original LWP was not co-opted the controlling programmed-process does not need to determine whether or not the system call should be reissued. Instead, the LWP is continued from where it was stopped.

One skilled in the art will understand that the previously discussed example (of a pipe write operation) is but one example of the use of the 'OSK LWP sleep' point 121 and that there are other future and current operating system services that have (or will have) a similar difficulty.

The invention provides a new type of lightweight process (OSK schedulable thread of execution) that allows a controlling program (such as a debugging program) to cause a target program to execute computer instructions without co-opting any of the target program's existing lightweight process. Instead, the controlling program uses the agent LWP to cause the target program to execute computer instructions on the controlling program's behalf. The target program is less susceptible to unintended changes of state because none of the existing LWPs that belong to the target program are co-opted by the controlling program.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for controlling a target programmed-process from a controlling programmed-process, said target programmed-process having a first non-agent lightweight programmed-process (LWP) scheduled by an operating system, said operating system capable of scheduling a plurality of LWPs in said target programmed-process, and said method comprising steps of:
   (a) stopping execution of said first non-agent LWP; and
   (b) invoking, by said controlling programmed-process, a first agent LWP in said target programmed-process without co-opting said first non-agent LWP to cause said target programmed-process to execute code specified by said controlling programmed-process.

2. The computer controlled method of claim 1 further comprising steps of:
   (c) terminating said first agent LWP; and
   (d) resuming said first non-agent LWP.

3. The computer controlled method of claim 1 wherein step (b) comprises steps of:

(b1) determining that said first agent LWP can be attached to said target programmed-process;
   (b2) creating said first agent LWP in said target programmed-process;
   (b3) initializing said first agent LWP; and
   (b4) running said first agent LWP.

4. The computer controlled method of claim 3 wherein step (b1) further comprises steps of:
   (b1a) determining that said target programmed-process is stopped; and
   (b1b) determining that said target programmed-process does not have an existing agent LWP.

5. The computer controlled method of claim 1 further comprising prohibiting resumption of said first non-agent LWP while said first agent LWP exists.

6. The computer controlled method of claim 1 further comprising prohibiting creation of a schedulable entity during said first agent LWP's existence.

7. The computer controlled method of claim 1 wherein said controlling programmed-process is a debugging programmed-process for debugging said target programmed-process.

8. An apparatus having a central processing unit (CPU) and a memory coupled to said CPU for controlling a target programmed-process from a controlling programmed-process, said target programmed-process having a first non-agent lightweight programmed-process (LWP) scheduled by an operating system, said operating system capable of scheduling a plurality of LWPs in said target programmed-process, and said apparatus comprises:
   a stop mechanism configured to stop execution of said first non-agent LWP; and
   an invocation mechanism configured to invoke, by said controlling programmed-process, a first agent LWP in said target programmed-process without co-opting said first non-agent LWP to cause said target programmed-process to execute code specified by said controlling programmed-process the invocation mechanism dependent on the stop mechanism.

9. The apparatus of claim 8 wherein the apparatus further comprises:
   a termination mechanism configured to terminate said first agent LWP after operation of the invocation mechanism; and
   a resumption mechanism configured to resume said first non-agent LWP after operation of the termination mechanism.

10. The apparatus of claim 8 wherein the invocation mechanism further comprises:
    a first determination mechanism configured to determine that said first agent LWP can be attached to said target programmed-process;
    a creation mechanism configured to create said first agent LWP in said target programmed-process dependent on the first determination mechanism;
    an initialization mechanism configured to initialize said first agent LWP dependent on the creation mechanism; and
    a LWP run mechanism configured to execute said first agent LWP after said first agent LWP is initialized by the initialization mechanism.

11. The apparatus of claim 10 wherein the first determination mechanism further comprises:
    a second determination mechanism configured to determine that said target programmed-process is stopped; and a third determination mechanism configured to determine that said target programmed-process does not have an existing agent LWP.

12. The apparatus of claim 8 further comprising a first check mechanism configured to prohibit resumption of said first non-agent LWP while said first agent LWP exists.

13. The apparatus of claim 8 further comprising a second check mechanism configured to prohibit creation of a schedulable entity during said first agent LWP's existence.

14. The apparatus of claim 8 wherein said controlling programmed-process is a debugging programmed-process for debugging said target programmed-process.

15. A computer program product comprising:
a computer usable storage medium having computer readable code embodied therein for controlling a target programmed-process from a controlling programmed-process, said target programmed-process having a first non-agent lightweight programmed-process (LWP) scheduled by an operating system, said operating system capable of scheduling a plurality of LWPs in said target programmed-process, and said computer readable code comprising:
computer readable program code devices configured to cause said computer to effect a stop mechanism configured to stop execution of said first non-agent LWP; and
computer readable program code devices configured to cause said computer to effect an invocation mechanism configured to invoke, by said controlling programmed-process, a first agent LWP in said target programmed-process without co-opting said first non-agent LWP to cause said target programmed-process to execute code specified by said controlling programmed-process, the invocation mechanism dependent on the stop mechanism.

16. The computer program product of claim 15 wherein the product further comprises:
computer readable program code devices configured to cause said computer to effect a termination mechanism configured to terminate said first agent LWP after operation of the invocation mechanism; and
computer readable program code devices configured to cause said computer to effect a resumption mechanism configured to resume said first non-agent LWP after operation of the termination mechanism.

17. The computer program product of claim 15 wherein the invocation mechanism further comprises:
computer readable program code devices configured to cause said computer to effect a first determination mechanism configured to determine that said first agent LWP can be attached to said target programmed-process;

computer readable program code devices configured to cause said computer to effect a creation mechanism configured to create said first agent LWP in said target programmed-process dependent on the first determination mechanism;
computer readable program code devices configured to cause said computer to effect an initialization mechanism configured to initialize said first agent LWP dependent in the creation mechanism; and
computer readable program code devices configured to cause said computer to effect a LWP run mechanism configured to execute said first agent LWP after said first agent LWP is initialized by the initialization mechanism.

18. The computer program product of claim 17 wherein the first determination mechanism further comprises:
computer readable program code devices configured to cause said computer to effect a second determination mechanism configured to determine that said target programmed-process is stopped; and
computer readable program code devices configured to cause said computer to effect a third determination mechanism configured to determine that said target programmed-process does not have an existing agent LWP.

19. The computer program product of claim 15 further comprising computer readable program code devices configured to cause said computer to effect a first check mechanism configured to prohibit resumption of said first non-agent LWP while said first agent LWP exists.

20. The computer program product of claim 15 further comprising computer readable program code devices configured to cause said computer to effect a second check mechanism configured to prohibit creation of a schedulable entity during said first agent LWP's existence.

21. The computer program product of claim 15 wherein said controlling programmed-process is computer readable program code devices configured to cause said computer to effect a debugging programmed-process for debugging said target programmed-process.

22. The computer controlled method of claim 1, wherein the non-agent LWP is a non-atomic operating system kernel procedure and further comprising:
resuming the execution of the non-agent LWP at a point the non-agent LWP stopped at during said step (a).

* * * * *